(12) United States Patent
Suzuki (10) Patent No.: US 7,882,604 B2
(45) Date of Patent: Feb. 8, 2011

(54) ASSEMBLED STRUCTURE

(75) Inventor: Tomotaka Suzuki, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 201 days.

(21) Appl. No.: 11/693,164

(22) Filed: Mar. 29, 2007

(65) Prior Publication Data

US 2007/0232126 A1  Oct. 4, 2007

(30) Foreign Application Priority Data

Mar. 30, 2006 (JP) .............................. 2006-094783

(51) Int. Cl.
*A44B 11/26* (2006.01)
(52) U.S. Cl. ........................................................ 24/633
(58) Field of Classification Search ................ 24/633, 24/639, 642
See application file for complete search history.

(56) References Cited

U.S. PATENT DOCUMENTS

| | | | | |
|---|---|---|---|---|
| 3,840,849 | A | * 10/1974 | Lohr | ................. 340/457.1 |
| 4,262,396 | A | * 4/1981 | Koike | ........................ 24/639 |
| 5,220,713 | A | * 6/1993 | Lane et al. | .................. 24/628 |
| 5,380,067 | A | * 1/1995 | Turvill et al. | .............. 297/484 |

FOREIGN PATENT DOCUMENTS

| | | |
|---|---|---|
| CN | 1714695 A | 1/2006 |
| JP | 58-15807 A | 1/1983 |
| JP | 62-97501 A | 5/1987 |
| JP | 11-41755 A | 2/1999 |
| JP | 2001-239076 A | 9/2001 |

OTHER PUBLICATIONS

Chinese Office Action dated Sep. 12, 2008 issued in corresponding Chinese Application No. 2007100913999.
Office Action mailed Aug. 17, 2010 issued by Japanese Patent Office in corresponding Japanese Patent Application No. 2006-094783.

* cited by examiner

*Primary Examiner*—James R Brittain
(74) *Attorney, Agent, or Firm*—Roberts Mlotkowski Safran & Cole, P.C.; Thomas W. Cole (57) ABSTRACT

An assembled structure comprising: a housing; a plate-shaped elastic member attached in the interior portion of the housing; and a confirming portion for confirming a state of attachment of the plate-shaped elastic member, wherein the confirming portion is provided in an elastic member attachment portion where the plate-shaped elastic member is attached in the housing, and is formed so as to confirm that the plate-shaped elastic member is properly attached in the housing with a predetermined positional relation between an attachment region of the plate-shaped elastic member attached to the housing and the confirming portion, is provided.

12 Claims, 8 Drawing Sheets

ASSEMBLED STRUCTURE

CROSS-REFERENCE TO RELATED APPLICATION

This application claims priority under 35 USC 119 from Japanese Patent Application No. 2006-094783, the disclosure of which is incorporated by reference herein.

BACKGROUND

1. Technical Field

The present invention relates to an assembled structure, specifically, to an assembled structure in which it can be easily confirmed that an attachment member has been properly attached to a member that receives attaching.

2. Related Art

A three-point seatbelt apparatus that is widely used in conventional passenger vehicles restrains the body of a passenger seated in the driver seat or passenger seat of a vehicle with a long belt-shaped webbing belt. Such an apparatus is provided with: a webbing windup device fixed at one side of the seat to the body of the vehicle; an anchor member fixed to the vehicle body in the vicinity of the webbing windup device; and a through-anchor attached to a center pillar of the vehicle above the webbing windup device. The base end portion of the webbing belt is latched to the spool of the webbing windup device and the leading end portion of the webbing belt is locked to the anchor member. The webbing belt is pulled out upwards from the spool of the webbing windup device, passes through a slit in the through-anchor, is folded back downwards, inserted through a slit in a tongue plate, and then reaches the anchor member.

A buckle device to which the tongue plate is engageable is fixed to the side opposite to the webbing windup device, with the seat of the vehicle body positioned between them.

The passenger seated in the seat pulls the tongue plate and pulls out the webbing belt from the webbing windup device, wraps it around his/her body, and next engages the tongue plate to the buckle device so as to hold the tongue plate. Thereby, the webbing belt is worn on the body.

In recent years, the backseats of many commercial vehicles have been adapted so that the position of the backseat can be changed in accordance with the number of passengers or the forms of cargoes to be carried, such as the seatback being dropped to the side opposite to that of the seat cushion so as to be made completely flat, or the seatback being made to turn until overlapping the seat cushion.

When the backseat of such a commercial vehicle is equipped with the three-point seatbelt apparatus such as found in the front seat, the portion of the webbing belt of the seatbelt apparatus between the through-anchor and the anchor member may get in the way of changing the arrangement of the backseat.

In a seatbelt apparatus corresponding to a backseat, a configuration is considered so that when the arrangement of the backseat is changed, the leading end portion of the webbing belt is detached from the anchor member and the webbing belt is wound up until the leading end portion thereof reaches the vicinity of the through-anchor, thereby it does not interfere with changing the arrangement of the backseat.

Embodiments have been considered for this type of seatbelt apparatus, such as one where a second tongue plate is provided at the leading end portion of the webbing belt and a connector buckle device that engages to the second tongue plate is attached to the anchor member. Examples of such connector buckle devices are recited in the Japanese Patent Application Laid-Open (JP-A) Nos. S58-15807 and S62-97501.

In the normal state of a seatbelt apparatus having the above-described configuration, the second tongue plate is engaged to the connector buckle device and the webbing belt is connected to the anchor member. When changing the arrangement of the backseat, all that needs to be done is for the engagement between the second tongue plate and the connector buckle device to be released.

The buckle device and the connector buckle device used in this seatbelt apparatus have a lock piece provided in a housing. This is configured so that by engaging the tongue plate inserted into the housing to the lock piece, movement of the tongue plate in the pullout direction of the housing is restricted. In order to remove the tongue plate from the buckle device and the connector buckle device, a release button provided at the surface of the housing is pressed or made to slide in a predetermined direction, whereby the engagement between the lock piece and the tongue plate is released.

In the buckle device and connector buckle device, the release button is usually biased, with a spring member such as a plate spring, towards a engaging position where the lock piece and the tongue plate are engaged. This is made so that the release button does not inadvertently enter the releasing position and the engagement between the lock piece and the tongue plate is not released.

If, however, the spring member is not properly attached to the housing, a problem occurs in that the release button is not biased towards the engaging position. And regardless of this problem, until now it has been difficult to confirm whether the spring member is properly attached in the housing either visually or with a simple mechanical sensor.

SUMMARY

The present invention is made in order to solve the above-described problem, and provides an assembled structure in which it can be confirmed either visually or with a simple mechanical sensor whether a plate-shaped elastic member such as a plate spring has been properly attached to the housing.

A first aspect of the present invention relates to an assembled structure comprising: a housing; a plate-shaped elastic member attached in the interior portion of the housing; and a confirming portion for confirming a state of attachment of the plate-shaped elastic member. The confirming portion is provided in the housing at an elastic member attachment portion where the plate-shaped elastic member is attached, and is formed so as to confirm that the plate-shaped elastic member is properly attached in the housing with a predetermined positional relation between an attachment region for the plate-shaped elastic member provided in the housing and the confirming portion.

The assembled structure has a confirming portion provided in an elastic member attachment portion formed in the housing, and it can be confirmed either visually or with a simple mechanical sensor that the plate-shaped elastic member has been properly attached in the housing, so expensive sensors for managing attachment quality become unnecessary. Accordingly, manufacturing lines can be designed to have lower costs.

A second aspect of the present invention relates to an assembled structure comprising: a housing; a plate-shaped elastic member attached in the interior portion of the housing; and a confirming portion for confirming a state of attachment of the plate-shaped elastic member. In the housing, an opening is provided into which a leading end of the plate-shaped elastic member attached in the housing is entered, and the confirming portion is provided adjacent to the opening and, with a predetermined positional relation between the leading end of the plate-shaped elastic member and the confirming portion, the confirming portion is formed so as to confirm that the plate-shaped elastic member is properly attached in the housing.

In this assembled structure, the confirming portion is formed adjacent to the opening provided in the housing, so the state of attachment of the plate-shaped elastic member can easily be confirmed from the exterior side of the housing.

A third aspect of the present invention relates to an assembled structure comprising: a housing; a plate-shaped elastic member attached in the interior of the housing; and a first and second confirming portion for confirming a state of attachment of the plate-shaped elastic member. In the housing, an opening is provided into which a leading end of the plate-shaped elastic member attached in the housing is entered. The first confirming portion is provided at an elastic member attachment portion to which the plate-shaped elastic member is attached in the housing, and is formed so as to confirm that the plate-shaped elastic member is properly attached at the housing with a predetermined positional relation between an attachment region in the housing and the first confirming portion. The second confirming portion is provided adjacent to the opening and is formed so as to confirm that the plate-shaped elastic member is properly attached in the housing with a predetermined positional relation between the leading end of the plate-shaped elastic member and the second confirming portion.

In the assembled structure, it can be confirmed whether the plate-shaped elastic member is properly attached in the elastic member attachment portion at the first confirming portion provided in the housing. Also, it can be confirmed whether the plate-shaped elastic member is attached without improper bending occurring midway at the second confirming portion provided adjacent to the housing opening.

Accordingly, the state of attachment of the plate-shaped elastic body in the assembled structure can be confirmed with a higher degree of reliability.

A fourth aspect of the present invention relates to the assembled structure of the first or third aspect, wherein the confirming portion is formed so as to confirm that the plate-shaped elastic member is properly attached in the housing with the confirming portion having the same height as that of a specified place of the attachment region of the plate-shaped elastic member.

In the assembled structure, it can be determined whether the plate-shaped elastic member is properly attached in the housing, by determining whether the confirming portion provided at the elastic member attachment portion and the specified place of the attachment region of the plate-shaped elastic member have the same height or not.

Accordingly, the confirmation of the state of attachment of the plate-shaped elastic member can be performed especially easily either visually or with a simple mechanical sensor.

A fifth aspect of the present invention relates to the assembled structure of the second or third aspect, wherein the confirming portion is formed so as to confirm that the plate-shaped elastic member is properly attached in the housing with the first confirming portion having the same surface as the leading end of the plate-shaped elastic member.

In the assembled structure, it can be determined whether the plate-shaped elastic member is properly attached in the housing by determining whether the confirming portion provided adjacent to the opening of the housing and the leading end of the plate-shaped elastic member have the same height or not.

Accordingly, the confirmation of the state of attachment of the plate-shaped elastic member can be performed especially easily either by sight or with a simple mechanical sensor.

A sixth aspect of the present invention relates to the assembled structure of any one of the first through fifth aspects, wherein a reference surface for confirming the state of attachment is formed at a specified position of the attachment region of the plate-shaped elastic member. The positional relation relative to the confirming portion provided at the elastic member attachment portion of the housing is used to make the confirmation.

In this assembled structure, it is determined the plate-shaped elastic member is suitably attached in the housing with, e.g., the reference surface having the same height as that of the confirming portion provided in the elastic member attachment portion of the housing. Accordingly, it can easily be confirmed whether the plate-shaped elastic member is properly attached with a simple detection means such as by sight or a mechanical sensor.

A seventh aspect of the present invention relates to the assembled structure of any one of the second, third, fifth, and sixth aspects, wherein the confirming portion provided adjacent to the opening is a confirmation surface.

In this assembled structure, it is observed visually whether the leading end of the plate-shaped elastic body is protruding from the confirmation surface or whether the leading end is positioned at the inner side of the housing relative to the confirmation surface. Due to this, the state of attachment of the plate-shaped elastic member can be easily confirmed.

An eighth aspect of the present invention relates to the assembled structure of any one of the first and third through seventh aspects, wherein a reactive force receiver that receives reactive force from the plate-shaped elastic member when the plate-shaped elastic member acts as a spring is formed at the elastic member attachment portion in the housing.

In an assembled structure such as in a buckle device or connector buckle device in which a spring act is applied to a plate spring member, if the reactive force receiver is not formed at the portion where the plate spring member is attached, the plate spring member pops out without flex. The above assembled structure has the reactive force receiver, so the popping out of the plate-shaped elastic member such as a plate spring member is prevented.

With the present invention explained above, an assembled structure is provided where it can be confirmed either visually or with a simple mechanical sensor whether the plate-shaped elastic member is properly attached to the housing.

BRIEF DESCRIPTION OF THE DRAWINGS

An exemplary embodiment of the present invention will be described in detail based on the following figures, wherein.

DETAILED DESCRIPTION

Hereafter, a buckle device that is one example of the assembled structure relating to the present invention will be explained.

Figure 1:
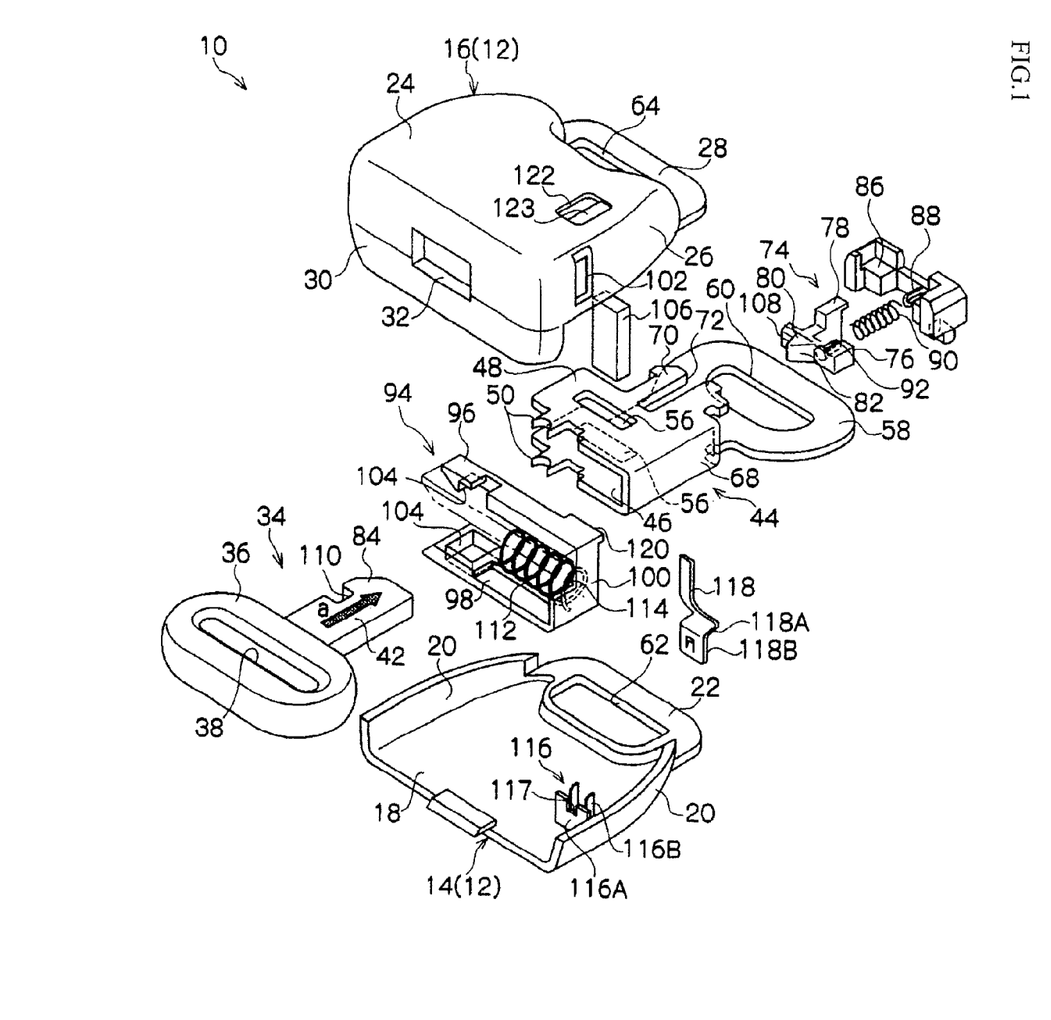
FIG. 1 is an exploded perspective view of a buckle device relating to a first embodiment.

A buckle device 10 relating to the exemplary embodiment is used for a wrap pretensioner that draws in a belt at a vehicle body attachment portion at the opposite side of the buckle. As shown in FIG. 1, the buckle device 10 is provided with: a housing 12 that comprises the main body of the device; a tongue plate 34 that is inserted into the interior of the housing 12 from an opening 32 along the direction of the arrow a and pulled out in the direction opposite to the arrow a; a lock piece 106 that engages to the tongue plate 34 in the interior of the housing 12; a buckle body 44 that is housed inside the housing 12, forms the main body of the buckle device, and holds the lock piece 106 at a predetermined position; and a release piece 94 that is arranged in the interior of the housing 12 adjacent to the buckle body 44 and releases the engagement between the tongue plate 34 and the lock piece 106.

The housing 12 is comprised of a lower housing 14 and an upper housing 16.

Figure 5:
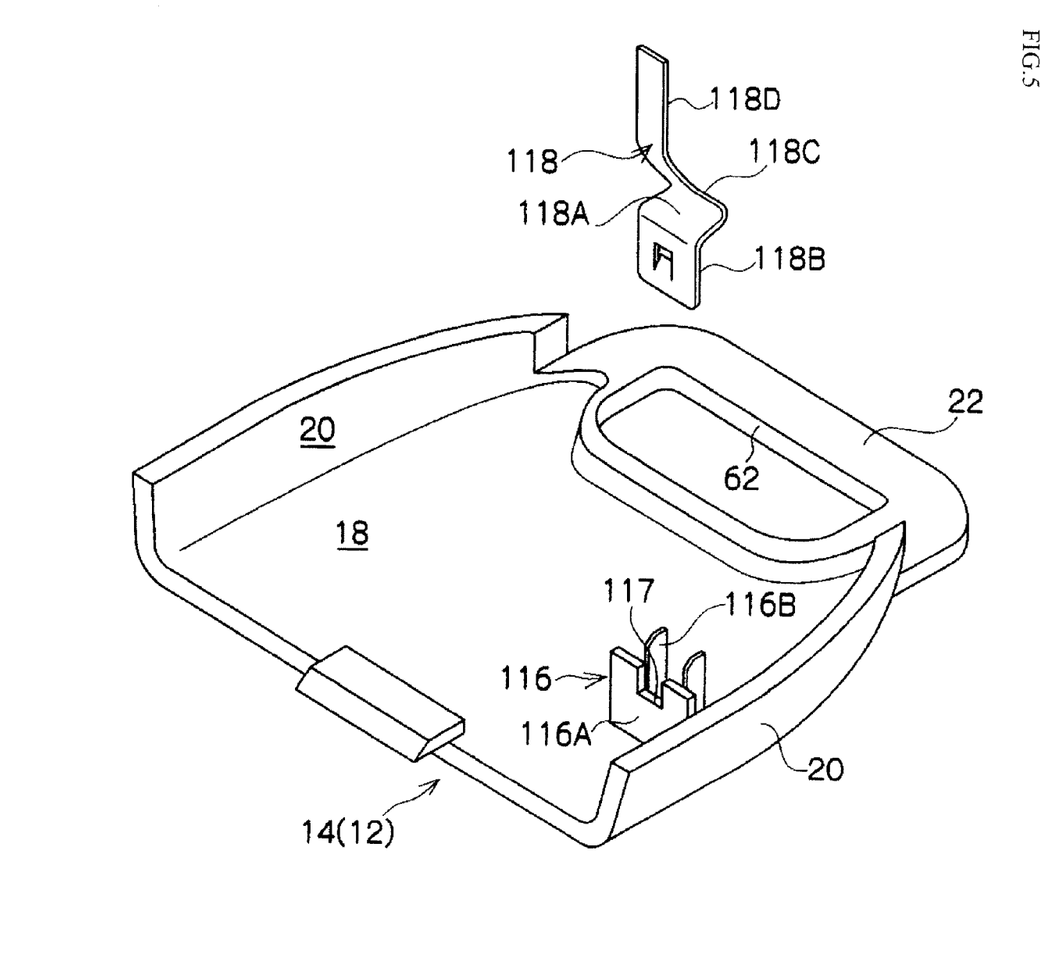
FIG. 5 is a perspective view showing the configuration of a lower housing that is provided in the buckle device relating to the first embodiment.

As shown in FIGS. 1 and 5, the lower housing 14 is formed from a bottom plate 18 and side walls 20 which are arranged to project from both ends in the widthwise direction of the bottom plate 18. A tongue-shaped flange 22 is formed at one end of the bottom plate 18 at the side opposite to the side where the tongue plate 34 is inserted/pulled out. Further, a regulating spring holder 116 is provided in the bottom plate 18 from which a regulating spring 118, which corresponds to the plate-shaped spring member of the present invention, is arranged to stand. Accordingly, the lower housing 14 and the bottom plate 18 correspond to the attachment member in the present invention.

One the other hand, the upper housing 16 is provided with a top plate 24 along the thickness direction of the above-described bottom plate 18 that faces the bottom plate 18, and with side walls 26 which continue at both ends of the top plate 24 in the widthwise direction thereof. The top plate 24 is formed into a shape that is substantially similar to that of the bottom plate 18. The housing 12 is formed by attaching the lower housing 14 and the upper housing 16 in the thickness direction of the bottom plate 18, and the edges of the side walls 20 and the edges of the side walls 26 abut with each other in a state of attachment.

A tongue-shaped flange 28 is formed at one end of the top plate 24 at the side opposite to the side where the tongue plate 34 is inserted/pulled out. The flange 28 is formed into a shape that is substantially similar to that of the flange 22. As described above, when attaching the upper housing 16 to the lower housing 14, both the flange 22 and the flange 28 face each other in the thickness direction of the bottom plate 18 and top plate 24.

Further, a vertical wall 30 is formed at the end portion of the top plate 24 at the side opposite to side where the flange 28 is formed. The vertical wall 30 abuts with the end portion of the bottom plate 18 at the side opposite to the side where the flange 22 is formed, in a state where the upper housing 16 has been attached to the lower housing 14. Also, the substantially rectangular opening 32 where the tongue plate 34 is inserted/pulled out is formed in the approximate center of the vertical wall 30.

The tongue plate 34 is provided with a base portion 36 that is long in the widthwise direction, and with an insertion piece 42 that extends outward from the base portion 36 and is inserted to/pulled out from the opening 32. A through-hole 38 is formed in the base portion 36 through which the leading end portion of a webbing belt (not shown) is inserted through. The webbing belt inserted through the through-hole 38 is folded back at the through-hole 38 and is connected to the base end side of the webbing belt rather than the through-hole 38 with suture and the like. Due to this, the leading end of the webbing belt is locked to the base portion 36 of the tongue plate 34.

A substantially rectangular notch 110 that engages to the lock piece 106 is formed in the side edge of the left side of the insertion piece 42 in FIG. 1. A slanted cut portion 84 cut off at an angle is formed at the leading end side ahead of the notch 110.

The buckle body 44 that is arranged in the interior of the housing 12 is provided with a guide plate 46, a guide plate 48, and a connecting piece 68. The guide plate 46 and guide plate 48 are integrally connected in the thickness direction by the connecting piece 68 with an interval therebetween which is larger than the thickness of the insertion piece 42.

The guide plate 46 and guide plate 48 are arranged to be substantially parallel to the bottom plate 18 and top plate 24, and protruding pieces 50 are arranged in a protruding condition at the end portion of the vertical wall 30 side.

Figure 2:
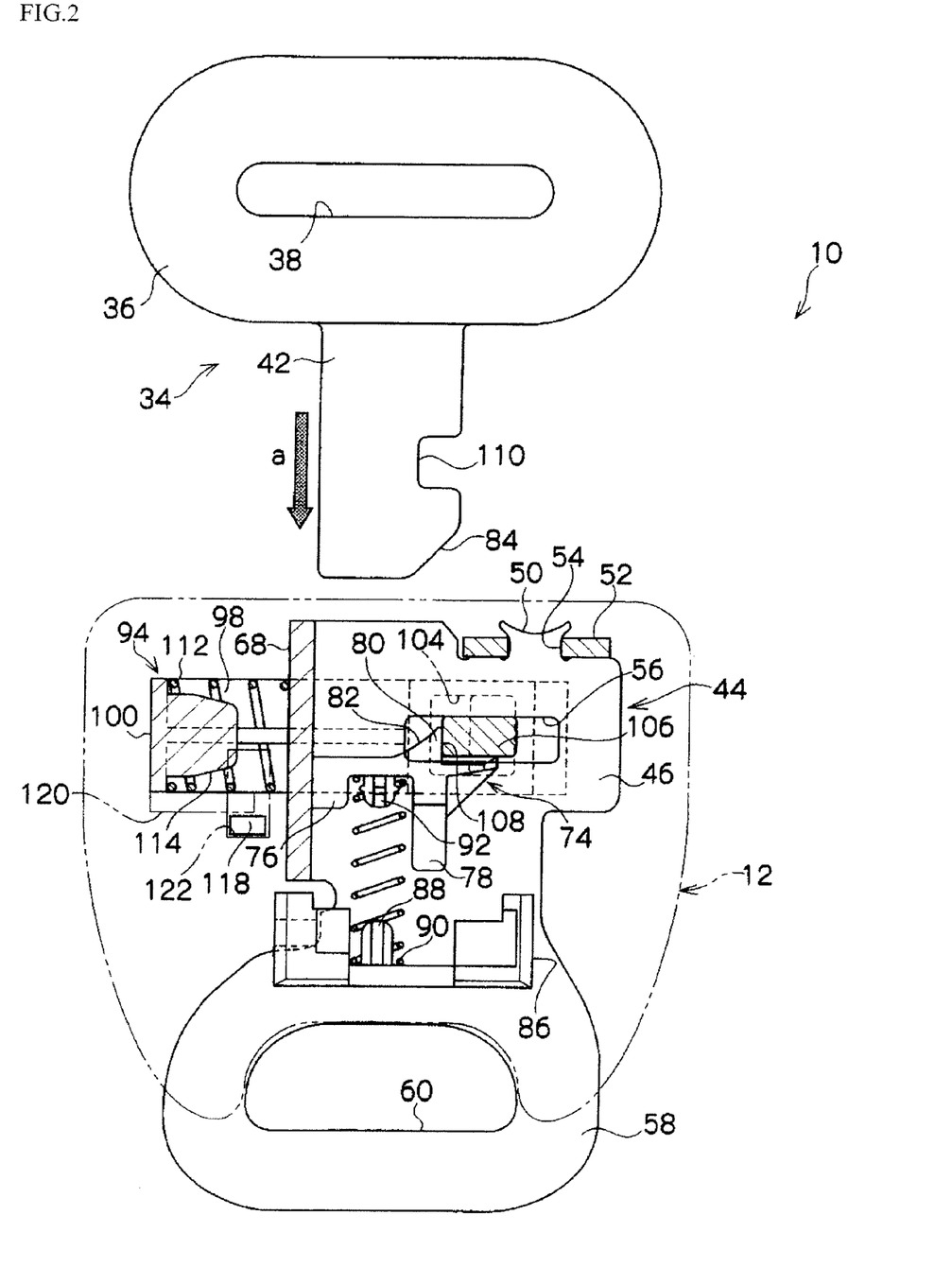
FIG. 2 is a cross-sectional plan view of the main portions of the buckle device relating to the first embodiment.
Figure 3:
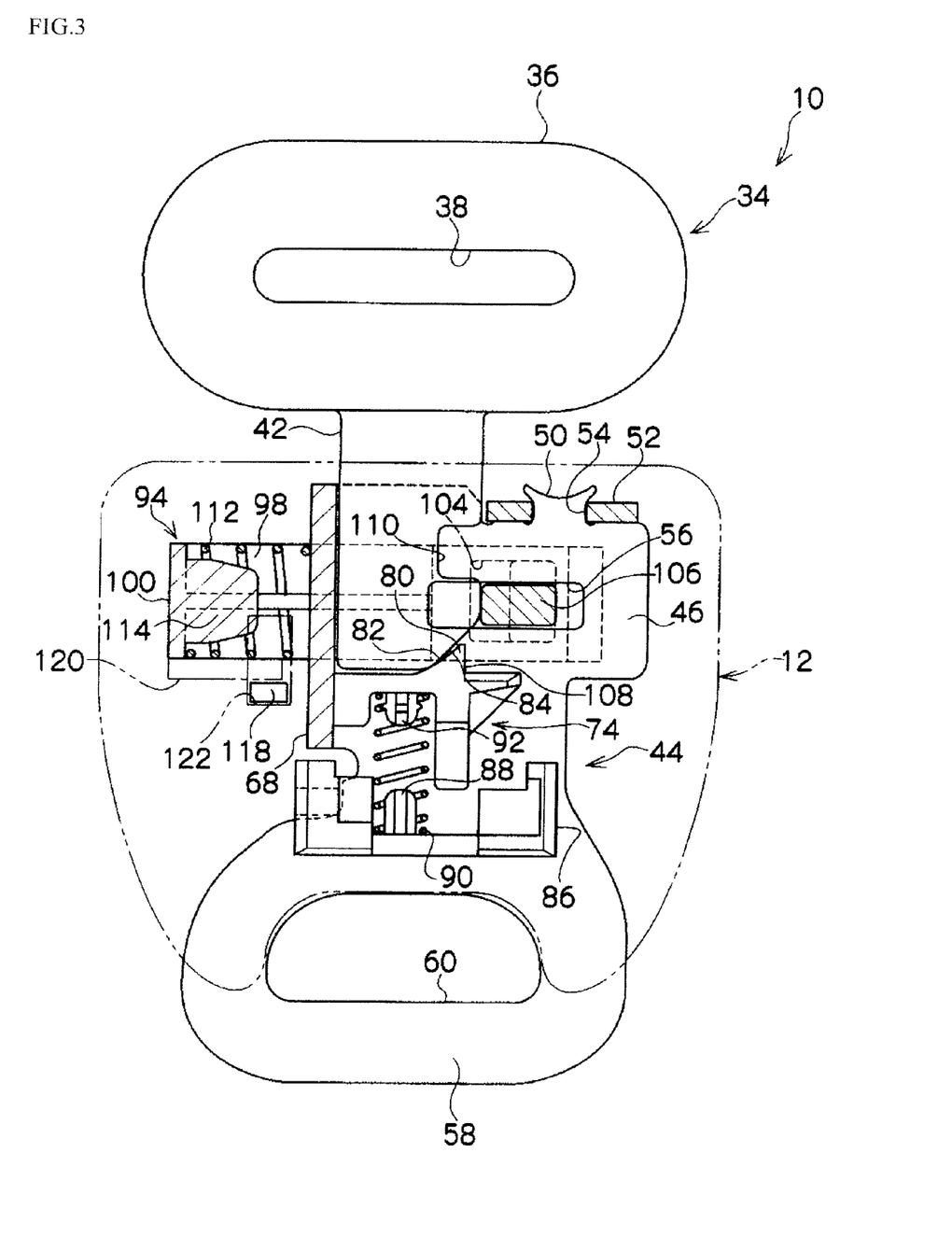
FIG. 3 is a cross-sectional view corresponding to FIG. 2 that shows a state where a tongue plate is beginning to be inserted into the main body of the device.
Figure 4:
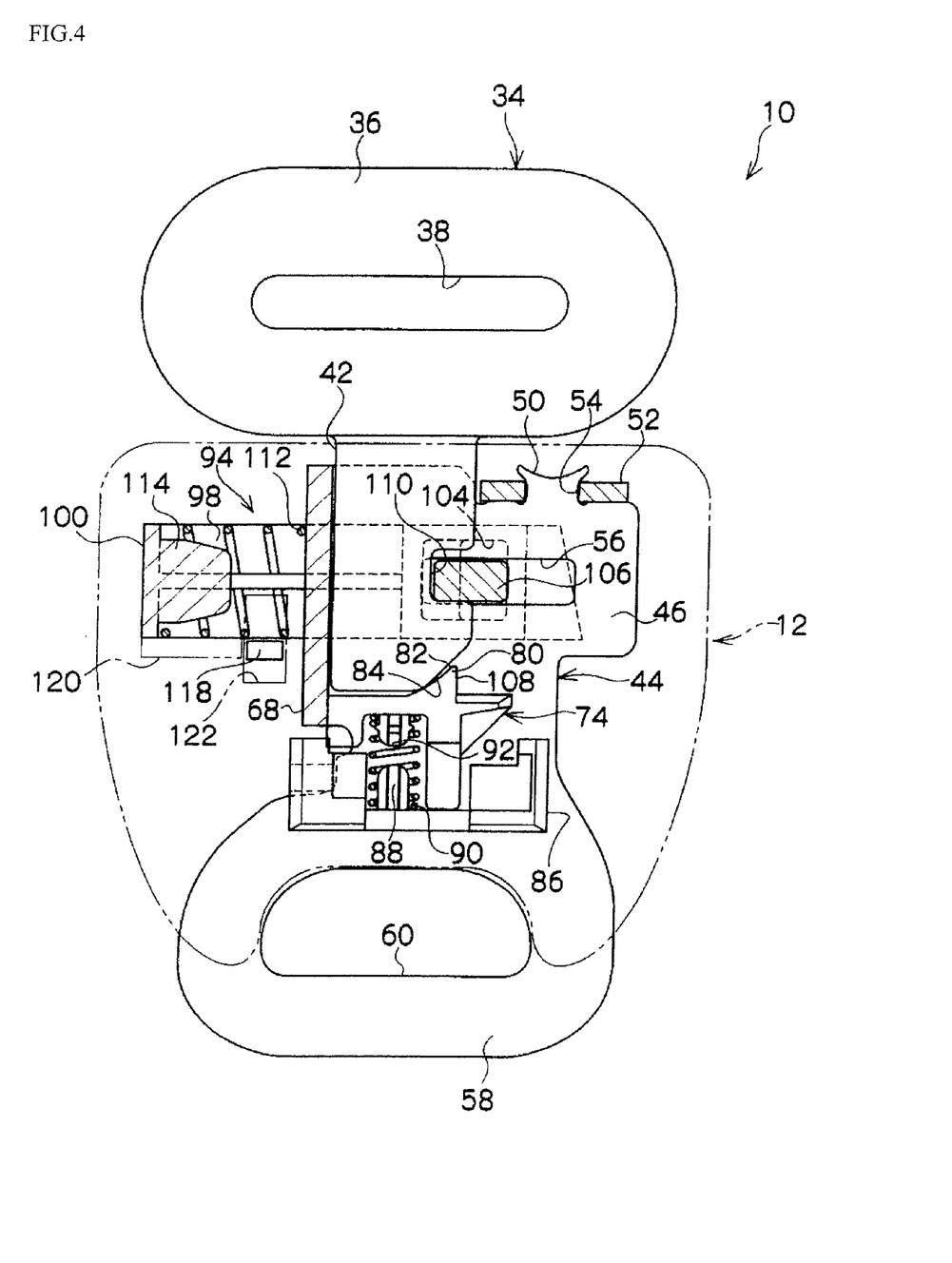
FIG. 4 is a cross-sectional view corresponding to FIG. 2 that shows a state where the tongue plate has been inserted into the main body of the device.

As shown in FIGS. 2-4, the protruding piece 50 is fit into a through-hole 54 of a bar support 52 formed to protrude from the inner surface of the top plate 24. Due to this, the guide plate 46 and guide plate 48 are positioned in the housing 12 during attaching, and displacement of the guide plate 46 and guide plate 48 in the direction towards the vertical wall 30 is restricted.

A rectangular guide hole 56 whose longitudinal direction follows the widthwise direction of the bottom plate 18 is formed in the guide plate 46. Also, an anchor plate 58 extends out from the downstream side edge along the insertion direction a of the tongue plate 34 of the guide plate 46. An insertion hole 60 is formed in the anchor plate 58.

The anchor plate 58 is formed to correspond to the above-described flange 22 and flange 28. The anchor plate 58 is sandwiched in between the flange 22 and the flange 28 in a state where the lower housing 14 and upper housing 16 are attached.

Corresponding to the insertion hole 60, an insertion hole 62 that is substantially similar in shape to the insertion hole 60 is formed in the flange 22, and an insertion hole 64 that is substantially similar in shape to the insertion hole 60 is formed in the flange 28. A belt member (not shown), e.g., of the same material as that of the webbing belt, is passed through the insertion holes 60-64.

The belt member is folded back at the insertion holes 60-64, after which the portion before the fold back and the portion after the fold back are connected by suturing and the like. Due to this, one end of the belt member is locked to the anchor plate 58. The end of the belt member at the side opposite to that locked to the anchor plate 58 is locked to a plate member formed from a material such as a metal. The plate member is locked to the vehicle body at a predetermined position with a fixing means such as a bolt. Due to this, the anchor plate 58 is indirectly locked to the vehicle body.

As shown in FIG. 1, the anchor plate 58 is not formed at the guide plate 48, rather, a slide guide 70 is formed to face the anchor plate 58. The slide guide 70 is a plate-shaped portion that extends from the guide plate 48, and a slit-shaped guide hole 72 is formed along the insertion direction a of the tongue plate 34.

An ejector 74 is provided between the guide plate 46 and the guide plate 48, as shown in FIG. 1. The ejector 74 is provided with a block-shaped ejector main body 76 that extends in a direction perpendicular to the insertion direction a of the tongue plate 34. The thickness of the ejector main body 76 is slightly smaller than the interval between the guide plate 46 and guide plate 48. Due to this, displacement of the ejector main body 76 along the thickness direction of the housing 12 is restricted by the guide plates 46, 48.

A guide piece 78 is formed on the end surface of the ejector main body 76 facing the top plate 24 side. The width dimension of the guide piece 78 is formed slightly smaller than the width of the opening of the above-described guide hole 72, and the guide piece 78 slides inside the guide hole 72. Due to this, the ejector main body 76 is guided along the guide hole 72.

As shown in FIGS. 1-4, a substantially right-angled triangularly-shaped protrusion 80 is formed at the end surface of the ejector main body 76 that faces the vertical wall 30 side. A slant face 82 of the protrusion 80 has a slant that corresponds to the slanted cut portion 84 formed at the leading end portion of the insertion piece 42. Accordingly, the insertion piece 42, which penetrates through the opening 32 and enters into the interior of the housing 12, enters between the guide plates 46, 48, and the leading end thereof abuts with the above-described end surface of the ejector main body 76 at the side of the slant face 82, and the slanted cut portion 84 abuts with the slant face 82.

As shown in FIGS. 1-4, a spring support piece 86 is provided along the insertion direction a of the tongue plate 34 at the downstream side of the ejector main body 76. The spring support piece 86 is formed into a long block shape in the widthwise direction of the bottom plate 18 and is fixed to the buckle body 44 on the guide plate 46.

A spring locking protrusion 88 is formed at the spring support piece 86 to protrude towards the ejector main body 76 side. The spring locking protrusion 88 is fit into the inner side of the eject spring 90, which is a compressed coil spring, from one end side thereof, and thus holds the eject spring 90.

A spring locking protrusion 92 is formed to protrude from the end surface of the ejector main body 76 at the side of the spring support piece 86 so as to face the spring locking protrusion 88. The spring locking protrusion 92 is fit into the inner side of the eject spring 90 from the other end side of the eject spring 90, thus holding the eject spring 90. Since the spring support piece 86 is fixed to the buckle body 44 as described above, the eject spring 90 biases the ejector 74 towards the vertical wall 30 side, i.e., towards the upstream side of the insertion direction a of the tongue plate 34.

As shown in FIG. 1, the release piece 94 is provided with a pair of release plates 96, 98, and a pressing piece 100 that is integrated with the release plates 96, 98.

The release plates 96, 98 are plate-shaped members with thin widths which extend in a direction that is perpendicular to the insertion direction a of the tongue plate 34. The release plate 96 is arranged between the bottom plate 18 and the guide plate 46 so as to be able to slide along the longitudinal direction, and the release plate 98 between the top plate 24 and the guide plate 48. The release plates 96, 98 are integrally connected by the pressing piece 100 at one end portion in the longitudinal direction.

A substantially rectangular opening 102 that corresponds to the pressing piece 100 is formed in the side wall 26 of the upper housing 16. A second release member (not shown) is to be inserted into the opening 102 and this resists the biasing force of a lock spring 112 (to be described later) and makes the release piece 94 move. Further, substantially rectangular holding holes 104 are formed in the release plates 96, 98 so as to open and face each other.

The holding holes 104 are formed to correspond to the above-described guide holes 56, and the holding holes 104 and guide holes 56 are opposite to each other along the thickness direction of the housing 12. The lock piece 106 is inserted between the holding holes 104. The lock piece 106 is a block-shaped member and passes through each of the guide holes 56 of the guide plates 46, 48.

The dimension of the opening of the holding holes 104 along the direction perpendicular to the insertion direction a of the tongue plate 34 is sufficiently shorter than the lengthwise dimension of the guide holes 56. Accordingly, as shown in FIG. 2, when the release piece 94 is moved towards the side opposite to the side where the pressing piece 100 is formed, the lock piece 106 pressed against the inner walls of the holding holes 104 also displaces with the release piece 94 while continuing to be guided by the guide holes 56.

Further, in a state where external force besides the biasing force of the eject spring 90 is not acting on the ejector 74, the protrusion 80 formed at the ejector 74 is positioned on the displacement trajectory of the lock piece 106 that accompanies the displacement of the release piece 94. Accordingly, an intervention surface 108 that is an end surface adjacent to the slant face 82 of the protrusion 80 abuts with the end portion of the lock piece 106 at the pressing piece 100 side, and restricts the displacement of the lock piece 106 towards the pressing piece 100 side.

As shown in FIGS. 1-4, the notch 110 having opening width dimension larger than the thickness dimension of the lock piece 106 is formed at the insertion piece 42 of the tongue plate 34, so the lock piece 106 enters into the inner side of the notch 110. Accordingly, when the insertion piece 42 is to be pulled out from the housing 12 in a state where the lock piece 106 has entered into the inner side of the notch 110, the lock piece 106 impedes against the inner wall of the notch 110, thereby restricting the movement of the insertion piece 42 in the direction in which the insertion piece 42 breaks out from the housing 12. Also, the bottom portion of the notch 110 is positioned more at the pressing piece 100 side of the release piece 94 than at the intervention surface 108 in the ejector 74, so the lock piece 106, which is released from the interference from the intervention surface 108 and enters into the notch 110, displaces more to the pressing piece 100 side than to the intervention surface 108 due to the biasing force of the lock spring 112.

As shown in FIGS. 1-4, the lock spring 112 formed from a compressed coil spring is arranged between the pressing piece 100 of the release piece 94 and the connecting piece 68 of the buckle body 44. A spring locking protrusion 114 fits through from one end of the lock spring 112 and holds the lock spring 112.

The other end of the lock spring 112 presses against the connecting piece 68 and biases the pressing piece 100 (i.e., the release piece 94) in a direction of taking the pressing piece 100 away from the connecting piece 68. In a state where a certain amount of external force that resists the biasing force of this lock spring 112 is not acting upon the release piece 94, the positions of the holding holes 104 are set so that the lock piece 106 provided between the holding holes 104 faces the slanted cut portion 84 along the insertion direction of the insertion piece 42 that passed through the opening 32.

An engaging portion 120 is formed at the side edge of the release plate 96 at the side opposite to the insertion side of the tongue plate 34. The engaging portion 120 engages with the regulating spring 118, which corresponds to the plate-shaped elastic member of the present invention, so as to be adjacent to the pressing piece 100.

As shown in FIGS. 1, 5, 6, and 7, the regulating spring holder 116 that holds the regulating spring 118 is arranged to stand at the bottom plate 18 of the lower housing 14. The regulating spring 118 is positioned along the side edge of the release piece 94 at the upstream side of the insertion direction a of the tongue plate 34, moreover, closer to the connecting piece 68 of the buckle body 44 than to the pressing piece 100 provided at the release piece 94. The regulating spring holder 116 corresponds to the elastic member attachment portion in the present invention.

The regulating spring holder 116 is provided with a forward rib 116A positioned at the upstream side of the insertion direction a of the tongue plate 34, and with a rear rib 116B that moves in coordination with the forward rib 116A to hold the regulating spring 118. The bottom end portion of the regulating spring 118 is inserted and held between the forward rib 116A and rear rib 116B. The reactive force from the regulating spring 118 is caught by the forward rib 116A. As shown in FIGS. 1, 5, 6, and 7, a first confirming portion 117 which is a rectangular depression formed in the central portion of the forward rib 116A.

Further, a rectangular through-hole 122 that corresponds to the leading end portion of the regulating spring 118 is formed in the top plate 24 of the upper housing 16. The leading end portion of the regulating spring 118 enters into the inner side of the through-hole 122. A second confirming portion 123 is provided adjacent to the through-hole 122. A first release member (not shown) is also to be inserted into the through-hole 122 to cause the regulating spring 118 to displace in a direction that releases the engagement between the engaging portion 120 of release plate 96 and the regulating spring 118. The first release member is engaged to the leading end of the regulating spring 118.

Figure 6:
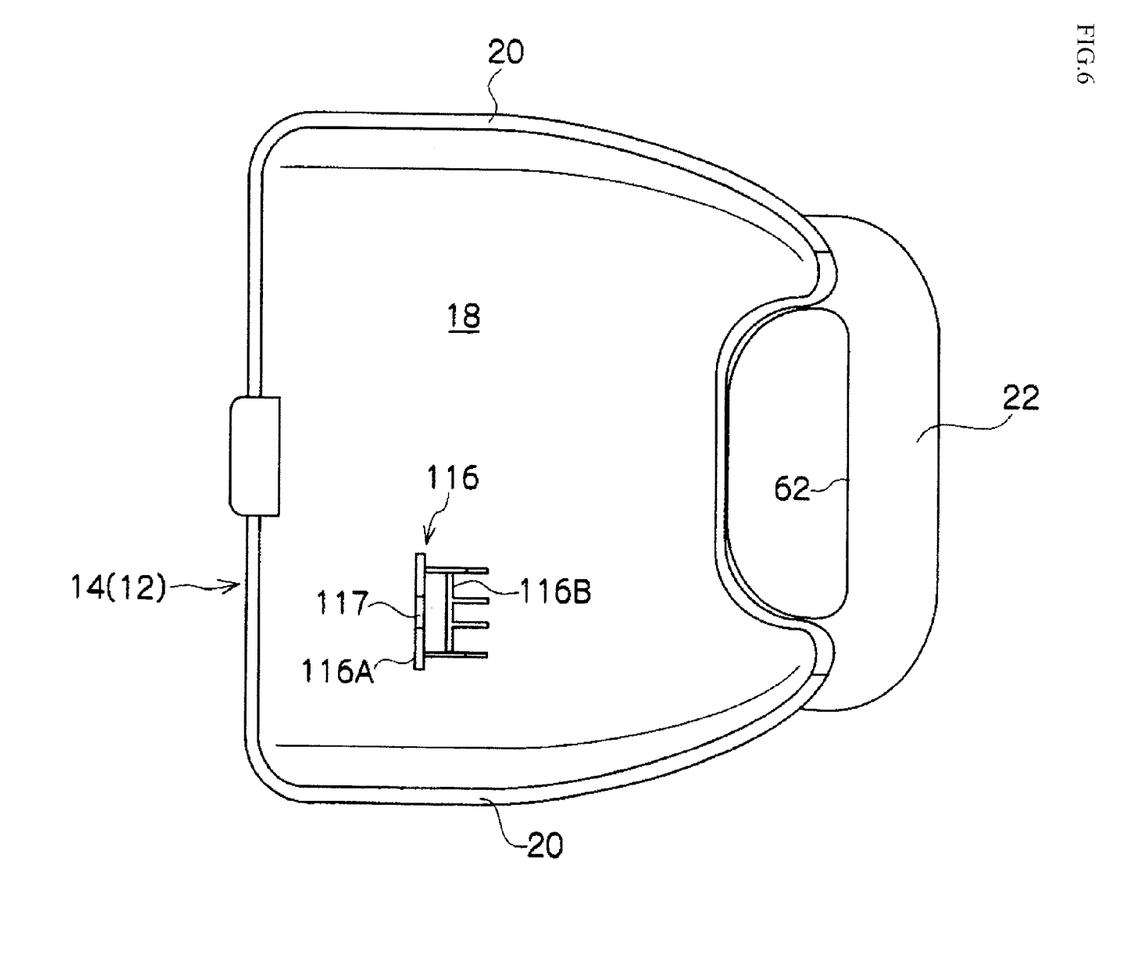
FIG. 6 is a plan view showing the configuration of the lower housing that is provided in the buckle device relating to the first embodiment.

The regulating spring 118 corresponds to the plate-shaped elastic member in the present invention. As shown in FIGS. 1, 5, and 6, an insertion portion 118B corresponding to the attachment portion in the present invention is formed at the lower end portion of the regulating spring 118, and is inserted into the regulating spring holder 116. A reference surface 118A bent at 90° is formed in the vicinity of the insertion portion 118B. A folded portion 118C is formed above the reference surface 118A and bent back towards the reference surface 118A and further, above that, a vertical portion 118D is formed. The vertical portion 118D of the regulating spring 118 is in the proximity of the release piece 94 and is pressed against the engaging portion 120.

Figure 7A:
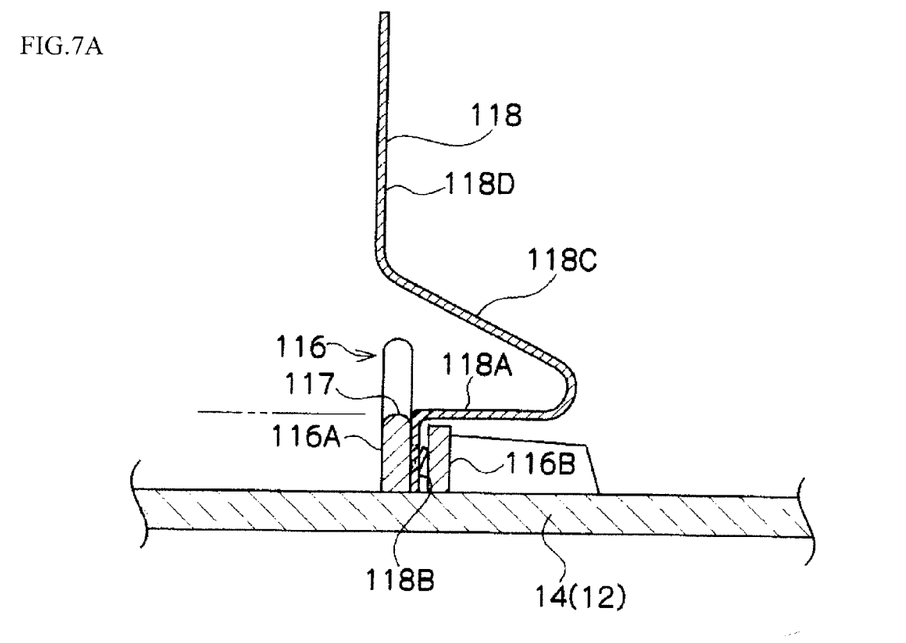
FIG. 7A is an explanatory drawing showing the relation between a flat portion formed at a regulating spring and a reference surface formed at a regulating spring holder in the buckle device relating to the first embodiment.
Figure 7B:
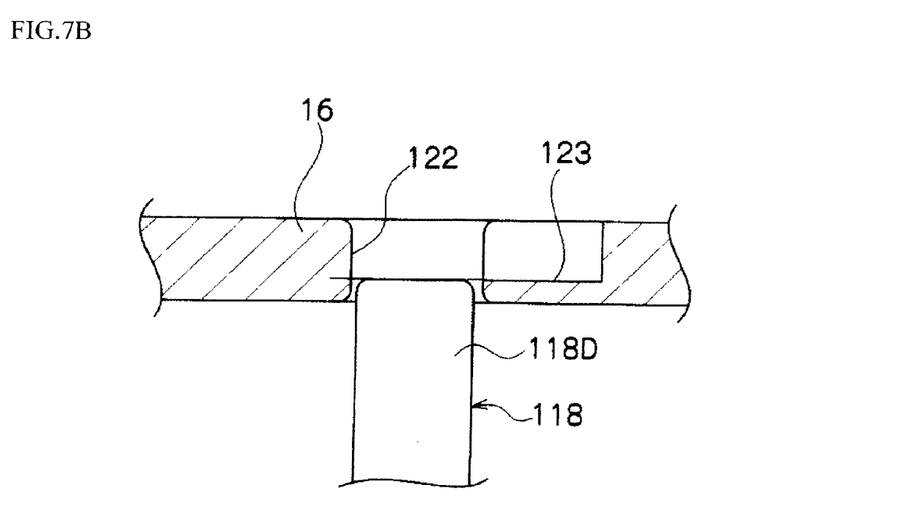
FIG. 7B is an explanatory drawing showing the leading end portion of the regulating spring and the reference surface formed at an upper housing in the buckle device relating to the first embodiment.

As shown in FIG. 7A, the reference surface 118A of the regulating spring 118 has the same height as that of the first confirming portion 117 at the forward rib 116A of the regulating spring holder 116. The first confirming portion 117 is provided in an elastic member attachment portion where the insertion portion 118B of the plate-shaped elastic member is inserted into the housing, and is formed with a rib portion 116A that aligns adjacent to and parallel with the bent surface or portion 118A so as to confirm that the insertion portion of the plate-shaped elastic member is properly inserted in the housing at a predetermined depth. As shown in FIG. 7B, the upper end edge of the regulating spring 118 has the same height as that of the second confirming portion 123, and the lower end portion of the regulating spring 118 can be confirmed to be inserted between the forward rib 116A and the rear rib 116B of the regulating spring holder 116. Determination as to whether the regulating spring 118 is properly inserted into the regulating spring holder 116 can be made visually, or a determination can be made as to whether the first confirming portion 117 can be inserted through by a sensor member in a case of a mechanical sensor with inserting the sensor member from the first confirming portion 117 to the regulating spring 118.

As shown in FIG. 2, the leading end portion of the regulating spring 118 abuts with the engaging portion 120 in a state where the intervention surface 108 of the ejector main body 76 is impeded by the lock piece 106. As shown in FIG. 4, in a state where the insertion piece 42 is inserted into the housing 12 and the lock piece 106 has entered into the inner side of the notch 110 so that the bottom portion of the notch 110 resists the biasing force of the lock spring 112 and restricts the displacement of the lock piece 106 towards the pressing piece 100 side, the leading end portion of the regulating spring 118 abuts with the release plate 96 at the leading edge side beyond the engaging portion 120. The movement of the lock piece 106 in the pullout direction from the notch 110 is restricted.

Next, the operation and effects of the buckle device 10 will be explained.

As shown in FIG. 2, in the buckle device 10, when the insertion piece 42 is inserted through the opening 32 and into the housing 12 from a state where the tongue plate 34 is disengaged from the housing 12, the insertion piece 42 is inserted between the guide plates 46, 48 and pulled out. The insertion piece 42 inserted between the guide plates 46, 48 has the slanted cut portion 84 abutting with the lock piece 106.

When the insertion piece 42 is inserted into the housing 12 even further in this state of abutment, the slanted cut portion 84 presses against the lock piece 106 along the widthwise direction of the bottom plate 18 towards the side opposite to that of the pressing piece 100. When this pressing force resists the biasing force of the lock spring 112, the lock piece 106 displaces together with the release piece 94 along the widthwise direction of the bottom plate 18 towards the side opposite to that of the pressing piece 100. Due to this, the interference from the intervention surface 108 on the lock piece 106 is released.

Next, when the insertion piece 42 is inserted from this state even further into the housing 12, as shown in FIG. 3, the lock piece 106 presses against one end in the widthwise direction of the insertion piece 42 due to the biasing force of the lock spring 112. Further, when the insertion piece 42 is inserted into the housing 12 and the notch 110 of the insertion piece 42 and the lock piece 106 face each other along the widthwise direction of the bottom plate 18, as shown in FIG. 4, the release piece 94 displaces with the biasing force of the lock spring 112 and the lock piece 106 enters into the notch 110.

Due to this, the movement of the tongue plate 34 in the direction in which the insertion piece 42 breaks out from the housing 12 is restricted, and the leading end portion of the webbing belt is attached at a predetermined position on the vehicle via the buckle device 10.

Also, as described above, when the insertion piece 42 is pressed even further into the housing 12 in a state where the slanted cut portion 84 has abutted with the lock piece 106, the leading end of the insertion piece 42 abuts with the ejector main body 76. When the insertion piece 42 is inserted further into the housing 12 in this state, the ejector 74 slides in a direction away from the vertical wall 30. Due to this, the eject spring 90 is compressed and the biasing force that biases the ejector 74 in the direction towards the vertical wall 30 increases.

Here, in a state where the movement of the tongue plate 34 is restricted due to the above-described lock piece 106, the lock piece 106 is entered into the notch 110 until it abuts with the bottom portion of the notch 110. In this state, the release piece 94 displaces towards the side of the biasing direction of the lock spring 112 more than in the state where the lock piece 106 is impeded by the intervention surface 108. Accordingly, in this state, the leading end of the regulating spring 118 abuts with the release plate 96 at the leading end side of the release plate 96 beyond the engaging portion 120, and the regulating spring 118 and engaging portion 120 face each other along the longitudinal direction of the release plate 96.

For this reason, in this state, when a certain amount of external force that resists the biasing force of the lock spring 112 acts upon the release piece 94, and the release piece 94 resists the biasing force of the lock spring 112 and is to displace, the regulating spring 118 is impeded by the engaging portion 120 and the displacement of the release piece 94 is restricted.

Figure 8:
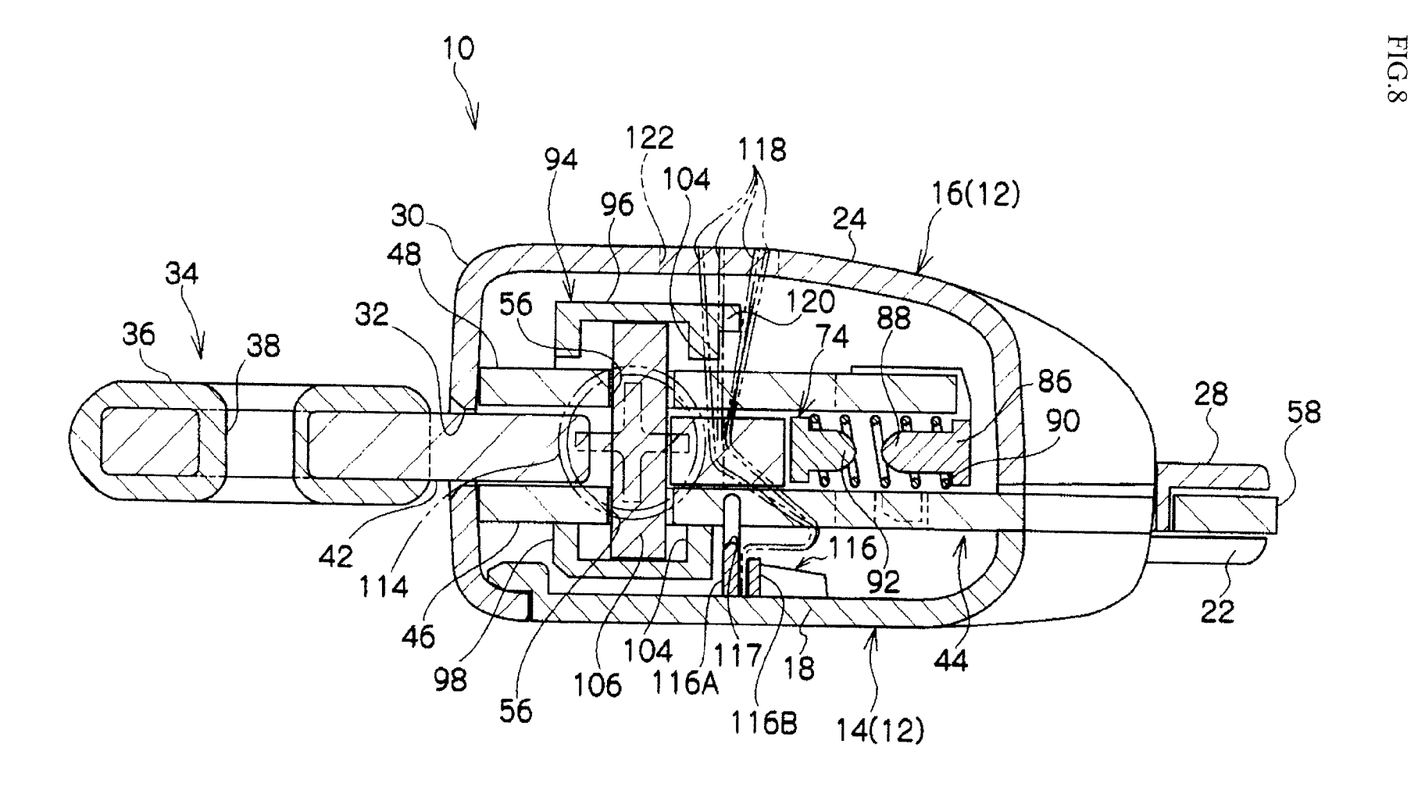
FIG. 8 is a cross-sectional side view showing the main portions of the buckle device relating to the first embodiment.

When the tongue plate 34 is to be pulled out from the housing 12, first, the first release member inserted in the through-hole 122 is made to engage to the leading end of the regulating spring 118. In this state, as shown in FIG. 8, the leading end side of the regulating spring 118 is caused to displace resisting the elasticity of the regulating spring 118 and, the regulating spring 118 is caused to disengage from the movement trajectory of the engaging portion 120 when the release piece 94 displaces due to the biasing force of the lock spring 112.

Next, while maintaining a state where the regulating spring 118 is disengaged from the movement trajectory of the engaging portion 120, the second release member inserted into the opening 102 is pressed and this resists the biasing force of the lock spring 112, and presses against the pressing piece 100.

As described above, in his state, the regulating spring 118 is disengaged from the movement trajectory of the engaging portion 120, so there are no instances of the engaging portion 120 being impeded by the regulating spring 118. Due to this, the pressing piece 100 (release piece 94) pressed by the second release member resists the biasing force of the lock spring 112 and moves.

When the release piece 94 moves, the lock piece 106 moves together with the release piece 94 and the lock piece 106 breaks out from the notch 110. When the lock piece 106 breaks out from the notch 110, the movement regulating due to the lock piece 106 of the tongue plate 34 is released. The insertion piece 42 is pressed in the direction of breaking out from the housing 12 and moves due to the biasing force of the eject spring 90 that is received via the ejector 74.

Due to this, the mechanical connection between the leading end portion of the webbing belt and a predetermined position of the vehicle is released, and the webbing belt is wound up, e.g., by a webbing windup device (not shown).

As previously discussed, in the buckle device 10, the reference surface 118A of the regulating spring 118 has the same height as that of the first confirming portion 117 of the regulating spring holder 116, and the height of the upper end edge of the regulating spring 118 is the same as that of the second confirming portion 123 provided in the top plate 24, so that it can be confirmed that the regulating spring 118 is properly attached to the regulating spring holder 116. For this reason, the determination as to whether the regulating spring 118 is properly inserted into the regulating spring holder 116 can be easily performed by sight or with a simple mechanical sensor.

Further, the insertion portion 118B of the regulating spring 118 is inserted between the forward rib 116A and the rear rib 116B, and a jig is inserted from a right angle direction relative to the forward rib 116A and rear rib 116B on the reference surface 118A, and is pressed downward towards the first confirming portion 117, whereby the regulating spring 118 can be attached to the regulating spring holder 116 with certainty.

Further, the regulating spring 118 is isolated from the lock spring 112 by the forward rib 116A, so the interference from the lock spring 112 is prevented.

In addition, the insertion portion 118B that is the root of the regulating spring 118 is held down by the forward rib 116A and the rear rib 116B, so the regulating spring 118 can be caused to flex freely.

Also, as described above, in a state where the movement of the tongue plate 34 is restricted by the lock piece 106, even when a certain amount of external force that resists the biasing force of the lock spring 112 acts upon the release piece 94, and the release piece 94 resists the biasing force of the lock spring 112 and tries to displace, the regulating spring 118 is impeded by the engaging portion 120 and the displacement of the release piece 94 is restricted. For this reason, inadvertent release of the movement regulating of the tongue plate 34 can be prevented with the lock piece 106 with certainty.

Besides a buckle device or a connector buckle device in a seatbelt apparatus, the present invention is also ideally suited for assembled structures of embodiments which attach attachment members to the interior portion of a housing and comprise an interior structure, such as an anchor structure or a webbing windup device.

What is claimed is:

1. An assembled structure comprising:
   a housing;
   a plate-shaped elastic member attached in the interior portion of the housing, said elastic member having an insertion portion and a bent portion substantially orthogonally disposed with respect to the insertion portion; and
   a confirming portion for confirming a state of attachment of the insertion portion of the plate-shaped elastic member,
   wherein the confirming portion is provided in an elastic member attachment portion where the insertion portion of the plate-shaped elastic member is inserted into the housing, and is formed with a rib portion that aligns adjacent to and parallel with the bent portion so as to confirm that the insertion portion of the plate-shaped elastic member is properly inserted in the housing at a predetermined depth, and
   wherein the confirming portion is formed so as to confirm that the plate-shaped elastic member is properly attached in the housing with the rib portion of the confirming portion having the same height as that of the bent portion of the plate-shaped elastic member.

2. An assembled structure comprising:
   a housing;
   a plate-shaped elastic member attached in the interior portion of the housing, said elastic member having a leading edge and a bent portion disposed across the elastic member and offset from and parallel to the leading edge; and
   a confirming portion for confirming a state of attachment of the leading edge of the plate-shaped elastic member,
   wherein in the housing, a slot-shaped opening is provided into which said leading edge of the plate-shaped elastic member is inserted, and the confirming portion is provided with a rib portion adjacent to the opening that aligns adjacent and parallel to the bent portion when the leading edge of the plate-shaped elastic member is inserted to a predetermined depth into said slot-shaped opening so as to confirm that the plate-shaped elastic member is properly attached in the housing.

3. An assembled structure comprising:

a housing;

a plate-shaped elastic member attached in the interior portion of the housing, said elastic member having a leading end, and an upper end; and a first and second confirming portions for confirming a state of attachment of the plate-shaped elastic member, wherein an opening is provided in the exterior of the housing into which said leading end of the plate-shaped elastic member attached in the housing is entered, the first confirming portion is provided at an elastic member attachment portion to which the plate-shaped elastic member is attached in the housing, and is formed so as to confirm that the plate-shaped elastic member is properly attached at the housing with a predetermined positional relation between an attachment region of the plate-shaped elastic member attached in the housing and the first confirming portion, and the second confirming portion is provided adjacent to the opening and is formed to align adjacently with the upper end of the plate shaped elastic member when the leading end of the elastic member is properly inserted into said elastic member attachment portion so as to confirm, upon visual observation of the exterior of the housing, that the plate-shaped elastic member is properly attached in the housing with a predetermined positional relation between the leading end of the plate-shaped elastic member and the second confirming portion.

4. The assembled structure of claim 3, wherein the first confirming portion is formed so as to confirm that the plate-shaped elastic member is properly attached in the housing with the first confirming portion having the same height as that of a specified place of the attachment region of the plate-shaped elastic member.

5. The assembled structure of claim 2, wherein the confirming portion is formed so as to confirm that the plate-shaped elastic member is properly attached in the housing with the confirming portion having the same surface as the leading end of the plate-shaped elastic member.

6. The assembled structure of claim 3, wherein the second confirming portion is formed so as to confirm that the plate-shaped elastic member is properly attached in the housing with the second confirming portion having the same surface as the leading end of the plate-shaped elastic member.

7. The assembled structure of claim 1, wherein a reference surface is formed at a specified position of the attachment region of the plate-shaped elastic member so as to confirm a state of attachment by a positional relation with the confirming portion provided at the plate-shaped elastic member in the housing.

8. The assembled structure of claim 2, wherein the confirming portion provided adjacent to the opening is a confirming surface.

9. The assembled structure of claim 3, wherein the second confirming portion provided adjacent to the opening is a confirming surface.

10. The assembled structure of claim 1, wherein a reactive force receiver that receives reactive force from the plate-shaped elastic member when the plate-shaped elastic member acts as a spring is formed at the elastic member attachment portion in the housing.

11. The assembled structure of claim 3, wherein a reactive force receiver that receives reactive force from the plate-shaped elastic member when the plate-shaped elastic member acts as a spring action is formed at the elastic member attachment portion in the housing.

12. An assembled structure comprising:

a housing;

a plate-shaped elastic member attached in the interior portion of the housing, said elastic member having a leading end, and an upper end; and a confirming portion for confirming a state of attachment of the plate-shaped elastic member, wherein an opening is provided in the exterior of the housing into which said leading end of the plate-shaped elastic member attached in the housing is entered, and the confirming portion is provided adjacent to the opening and is formed to align adjacently with the upper end of the plate-shaped elastic member when the leading end of the elastic member is properly inserted into said elastic member attachment portion so as to confirm, upon visual observation of the exterior of the housing, that the plate-shaped elastic member is properly attached in the housing with a predetermined positional relation between the leading end of the plate-shaped elastic member and the confirming portion.

\* \* \* \* \*